United States Patent

Matsuo et al.

Patent Number: 5,391,851
Date of Patent: Feb. 21, 1995

[54] MULTI-POINT WELDING METHOD AND CATALYST SUPPORT PRODUCED THEREBY

[75] Inventors: Kiyotaka Matsuo, Kota; Masao Yokoi, Takahama; Yasuyuki Kawabe, Okazaki; Ichiro Hashimoto; Keiji Ito, both of Nagoya, all of Japan

[73] Assignees: Nippon Soken Inc., Nishio; Nippondenso Co., Ltd., Kariya, both of Japan

[21] Appl. No.: 890,608

[22] PCT Filed: Nov. 11, 1991

[86] PCT No.: PCT/JP91/01543

§ 371 Date: Jul. 13, 1992

§ 102(e) Date: Jul. 13, 1992

[87] PCT Pub. No.: WO92/08571

PCT Pub. Date: May 29, 1992

[30] Foreign Application Priority Data

Nov. 14, 1990 [JP] Japan .................... 2-310096

[51] Int. Cl.⁶ .................................. B23K 11/00
[52] U.S. Cl. .......................... 219/72; 219/117.1
[58] Field of Search ............. 219/72, 117.1, 137 R, 219/74

[56] References Cited

U.S. PATENT DOCUMENTS

| | | | |
|---|---|---|---|
| 1,827,210 | 10/1931 | Siebs | 219/72 |
| 2,687,466 | 8/1964 | Mott | 219/74 |
| 3,098,928 | 7/1963 | Wagner | 219/72 |
| 4,123,646 | 10/1978 | Keinanen | 219/137 R |
| 4,282,186 | 8/1981 | Nonnenmann et al. | |
| 4,381,590 | 5/1983 | Nonnenmann et al. | |
| 4,400,860 | 8/1983 | Nonnenmann et al. | |
| 4,519,120 | 5/1985 | Nonnenmann et al. | |
| 4,521,947 | 6/1985 | Nonnenmann et al. | |

FOREIGN PATENT DOCUMENTS

| | | | |
|---|---|---|---|
| 0020318 | 12/1980 | European Pat. Off. | 219/72 |
| 57-55886 | 11/1982 | Japan . | |
| 63185627 | 8/1983 | Japan . | |
| 60-148681 | 8/1985 | Japan . | |
| 61-199574 | 9/1986 | Japan . | |
| 1242153 | 9/1989 | Japan . | |

*Primary Examiner*—Clifford C. Shaw
*Attorney, Agent, or Firm*—Cushman, Darby & Cushman

[57] ABSTRACT

Disclosed is a multi-point welding method capable of certainly welding an object having a number of points to be welded for a short time. First, an approximately cylindrical base body is formed by alternately laminating a flat sheet and a corrugated sheet and then winding them in a spiral shape. In this case, there exist a number of contact points of the flat sheet to the corrugated sheet, that is, points to be welded. Next, there is provided an electrode apart from one end surface of the base body by a specified interval and facing to the end surface. After that, by intermittently applying a current across the electrode and the one end surface of the base body thereby intermittently generating electric discharges between the electrode and the one end surface of the base body, to thus fuse and weld the points to be welded of the flat sheet to the corrugated sheet. With this arrangement, it is possible to certainly weld multi-points to be welded for a short time by only intermittently applying electric discharges.

10 Claims, 3 Drawing Sheets

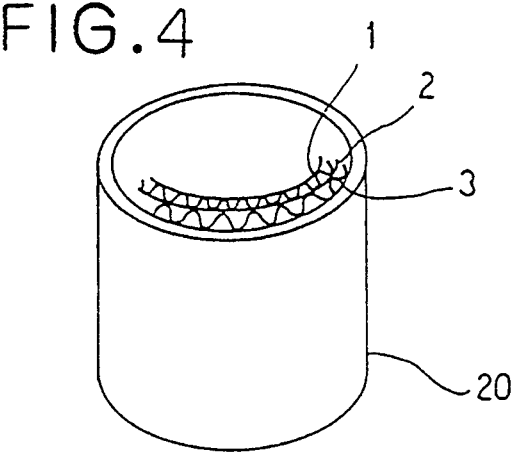
FIG. 4
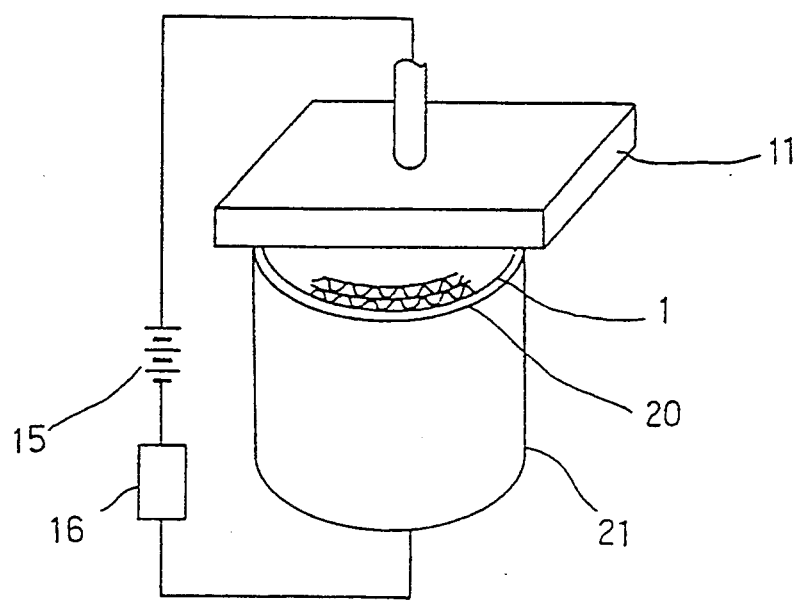
FIG. 5
FIG. 6A
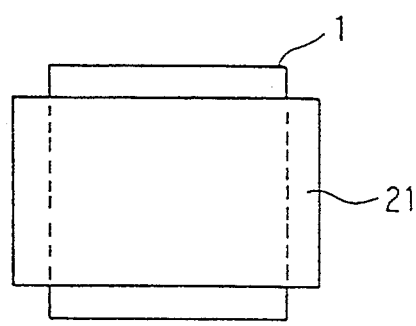
FIG 6B
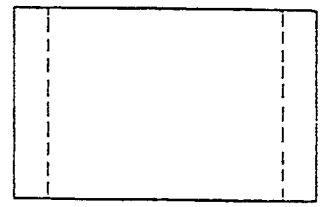

MULTI-POINT WELDING METHOD AND CATALYST SUPPORT PRODUCED THEREBY

TECHNICAL FIELD

The present invention relates to a method of welding multi-points to be welded for a short time and an object produced thereby, for example, a catalyst support for purifying exhaust gas.

BACKGROUND ART

An example of an object having multi-points to be welded includes a catalyst support for purifying exhaust gas. The catalyst support is composed of a base body formed by alternately laminating a flat sheet and a corrugated sheet and then winding them in a spiral shape, and an outer shell mounted around the outermost periphery of the base body for fixing the base body and enhancing the strength thereof. In such a catalyst support, the flat sheet needs to be welded to the corrugated sheet for preventing separation therefrom. However, there exist a number of contact points of the flat sheet to the corrugated sheet, that is, there exist a number of points to be welded corresponding to the contact points.

For joining the flat sheet to the corrugated sheet, there have been proposed techniques, for example, a brazing method disclosed in Japanese Patent Laid-open No. sho 61-199574 and a laser welding method disclosed in Japanese Patent Laid-open No. sho 63-185627.

Also, there has been proposed a method of joining the outermost periphery of the base body to the outer shell, for example, a caulking method disclosed in Japanese Patent Publication No. sho 57-55886.

However, the above brazing method disclosed in Japanese Patent Laid-open No. sho 61-199574 has a disadvantage that the metal made flat sheet or corrugated sheet is heat-affected in brazing to be deteriorated in its heat resistance.

Also, the above laser welding method disclosed in Japanese Patent Laid-open No. sho 63-185627 is a difficulty of perfectly joining all of the contact points of the flat sheet to the corrugated sheet. Accordingly, for perfect joining of all of the contact points, a laser beam needs to be scanned over the whole range of the end surface of the base body, which causes a problem of taking a long time.

Further, the above caulking method for joining the base body to the outer shell, disclosed in Japanese Patent Publication No. sho 61-199574, has a disadvantage that a joining process for the base body and outer shell must be separated from a base body forming process, thus increasing the time required for production.

Taking the above into consideration, an object of the present invention is to provide a multi-point welding method wherein multi-points to be welded are certainly welded for a short time. Another object of the present invention is to provide a method of producing a catalyst support for purifying exhaust gas wherein a flat sheet is certainly welded to a corrugated sheet for a short time thereby obtaining a catalyst support for a short time. A further object is to provide a catalyst support for purifying exhaust gas wherein a flat sheet is certainly welded to a corrugated sheet for a short time.

DISCLOSURE OF THE INVENTION

To achieve the above object, the present inventors have earnestly studied and noticed the fact that, the electric discharge machining, used in only cutting such as diesinking or wire-cut, functions to generate a large number of instantaneous electric discharges and hence to fuse the surface of the object thereby performing diesinking or wire-cut, and consequently examined the application of the above electric discharge machining to the joining process Of multi-points.

The present inventors have thus found that the above electric discharge machining is applicable to electric discharge welding by interrupting electric discharges existing at a point to be welded before the object is fused and cut, and therefore, have adopted the above technique as a multi-point welding method.

In a first aspect of the present invention, there is provided a multi-point welding method comprising the steps of: bringing points to be welded of an electric conductive first object to an electric conductive second object in contact with each other; mounting an electrode apart from the points to be welded of the first object to the second object by a specified interval and facing to at least the points to be welded; and intermittently applying a current across the electrode and at least one of the first and second objects thereby intermittently generating electric discharges at least between the electrode and the points to be welded.

In a second aspect of the present invention, there is provided a multi-point welding method adapted to produce a catalyst support for purifying exhaust gas, comprising the steps of: forming an approximately cylindrical base body by alternately laminating a metal made flat sheet and a metal made corrugated sheet and then winding them in a spiral shape; mounting an electrode apart from one end surface of the base body by a specified interval and facing thereto; and intermittently applying a current across the electrode and the base body thereby intermittently generating electric discharges in an interval between the electrode and the one end surface of the base body to thus fuse and join the contact points of the flat sheet to the corrugated sheet.

In a third aspect of the present invention, there is provided a multi-point welding method adapted to produce a catalyst support for purifying exhaust gas, comprising the steps of: forming an approximately cylindrical base body by alternately laminating an electric conductive metal made flat sheet and an electric conductive metal made corrugated sheet having approximately the same shape as the flat sheet and then winding them in a spiral shape; mounting an outer shell around the outermost periphery of the base body; mounting an electrode apart from one end surface of the base body by a specified interval and facing thereto; and intermittently applying a current across the electrode and the base body thereby intermittently generating in an interval between the electrode and base body to thus fuse and join the flat sheet, corrugated sheet and outer shell to each other at the same time.

In a fourth aspect of the present invention, there is provided a catalyst support formed by alternately laminating a flat sheet and corrugated sheet and then winding them in a spiral shape, wherein the contact points of the flat sheet to the corrugated sheet are fused and welded to each other by a multi-point welding method of facing an electrode to one end surface of the catalyst support and intermittently generating electric discharges between the electrode and the one end surface of the base body.

According to the present invention, the contact points of the first object to the second object are subjected to intermittent electric discharges and are welded.

Specifically, in welding, when electric discharges are temporarily cut off, a point subjected to electric discharges is in a fused state, and accordingly, has a discharge distance made longer than that of the other points to be welded. As a result, since electric discharges are liable to be generated at a point having a short discharge distance, the next electric discharges never fail to be generated at the other any one of points to be welded. Thus, by intermittently generating electric discharges, the points to be welded are sequentially welded. Also, electric discharges are not generated at the point welded once, thereby preventing a problem of generating excessive fused loss at the contact points. Therefore, it is possible to certainly weld a number of contact points of the first object to the second object by only intermittently generating electric discharges.

As mentioned above, the present invention is so constituted that the flat sheet is welded to the corrugated sheet by intermittently generating electric discharges at the end surface of the base body composed of the flat sheet and corrugated sheet which are alternately laminated and then wound. Accordingly, by only intermittently generating electric discharges on the one end surface of the base body, there can be realized certain welding between the flat sheet and corrugated sheet.

Also, the present invention achieves not only the joining of the base body to the outer shell for a short time but also the joining among the flat sheet, corrugated sheet and outer shell at the same time, which enables production of a catalyst support for purifying exhaust gas for a short time.

Further, since the present invention is characterized by electric discharge welding the end surface of a catalyst support composed of a flat sheet and a corrugated sheet alternately laminated and then wound, it is possible to secure high ventilation resistance in comparison with the case using the conventional brazing method having a possibility that brazing filler metal used for bonding the flat sheet to the corrugated sheet is protruded in a gas passage formed by the flat sheet and corrugated sheet.

Compared with a laser welding method, in the present invention, electric discharges are certainly generated at the contact points of the flat sheet to the corrugated sheet, and therefore, there can be obtained a catalyst support composed of the flat sheet and corrugated sheet certainly welded to each other.

BRIEF DESCRIPTION OF THE INVENTION

FIG. 4 is a perspective view of a honeycomb catalyst support;

FIG. 5 is an explanatory view showing a welding process of a second embodiment;

FIGS. 6a and 6b are views for explaining the second embodiment; and

BEST MODE OF CARRYING OUT THE INVENTION

Figure 1:
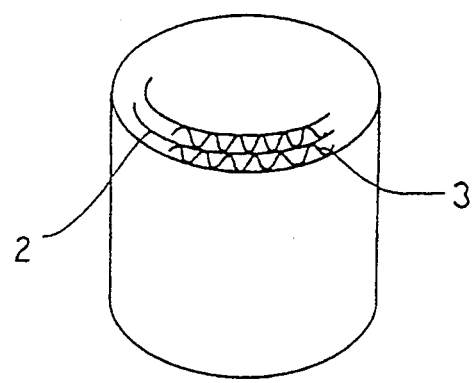
FIG. 1 is a perspective view of a base body.

Referring to FIG. 1, there is shown a base body of a honeycomb catalyst support for purifying exhaust gas according to the present invention.

A base body is composed of a flat sheet 2 as a first object and a corrugated sheet 3 as a second object. The flat sheet 2 and corrugated sheet 3 are made of ferritic heat resisting stainless steel(75Fe-20Cr-5A1-REM) and have a thickness of 50 $\mu$m. In addition, the corrugated sheet 3 has a pitch of 1.25 mm.

The flat sheet 2 and corrugated sheet 3 are alternately laminated and then wound, to thus form a cylindrical base body having a diameter of approximately 77 mm and an axial length of 105 mm. The base body thus obtained has a number of ventilation holes formed by the flat sheet 2 and corrugated sheet 3.

Figure 2:
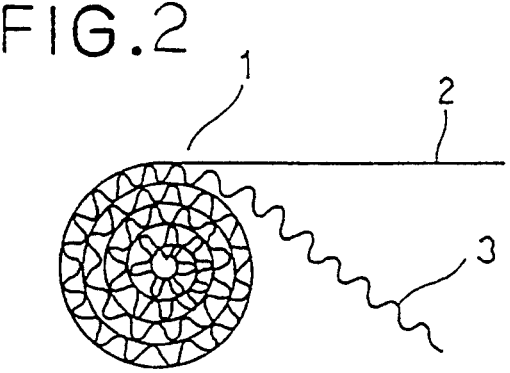
FIG. 2 is an explanatory view showing a forming process of a first embodiment.

As shown in FIG. 2, in a base body forming process for forming a cylindrical base body 1 by winding the flat sheet 2 and corrugated sheet 3, the flat sheet 2 is brought in contact with the corrugated sheet 3 at a number of vertexes of the corrugated sheet 3.

Figure 3:
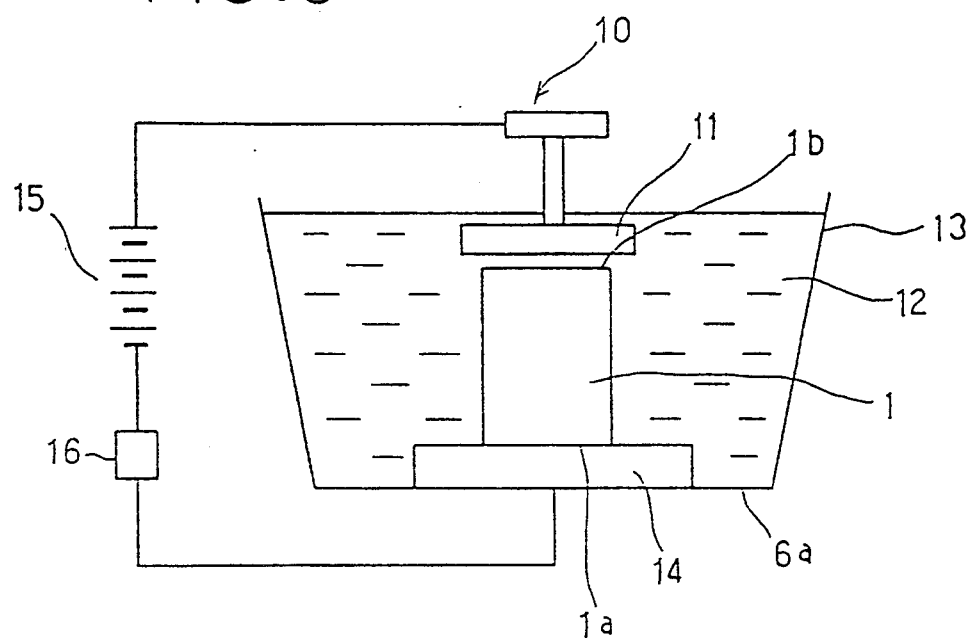
FIG. 3 is an explanatory view showing a welding process of the first embodiment.

FIG. 3 is an explanatory view showing an electrode mounting process and a joining process wherein the flat sheet 2 is welded to the corrugated sheet 3.

First, in the electrode mounting process, there is prepared an electric discharge machine 10 (ED-28 ®, Makino Seisaku) capable of intermittently generating electric discharges by intermittently applying a current. The electric discharge machine 10 has a first copper made electrode plate 11 having a size of 100 mm×100 mm×20 mm, and a second electrode 14 which is mounted on the bottom portion 13a of a vessel 13 filled with a working liquid 12 at such a position as facing to the first electrode 11. With this arrangement, a current is applied across the first and second electrodes 11 and 14, to intermittently generate electric discharges.

The working liquid 12 serves to eliminate fused substances generated by electric discharge welding and to prevent temperature rise of the workpiece. Further, with the aid of the working liquid 12, the electric discharges are intermittently generated by the intermittently applied current in the electric discharge machine 10 is allowed to instantaneously disappear at the time of cutting off a current.

Between the first and second electrodes 11 and 14, there are provided a power supply 15 for supplying a voltage and a current control unit 16 for controlling a current.

Subsequently, the cylindrical base body 1 obtained in the base body forming process is brought in electric contact at one end surface 1a thereof with the second electrode 14 of the electric discharge machine 10, and is dipped in the working liquid 12. In this case, as the working liquid 12, there is used a Titan cleaner No. 6A mainly containing kerosene.

Next, in a welding process, a power supply 15 applies a voltage of approximately 60 V across the electrode 11 and the second electrode 14, after which the electrode 11 is moved closely to the other end surface 1b of the base body 1 thus starting electric discharging between the end surface 1b of the base body 1 and the electrode 11. In the above, the applied current is controlled to be 24A. Further, the aforesaid current control unit 16 intermittently switches the current flow to thereby intermittently generate electric discharges in the range of a pulse width of 200 millisecond (ms).

Consequently, electric discharges are generated at the contact points of the flat sheet 2 to the corrugated sheet 3.

The contact points thus subjected to electric discharges are fused and welded to each other, and has the discharge distance between the first electrode 11 and the same made longer by the fused width caused by the electric discharges. Since electric discharges are liable to be generated at the point having a short discharge distance, the next electric discharges are generated not at the portion subjected to electric discharges once but at the other any one of contact points of the flat sheet 2 to the corrugated sheet 3. Therefore, it is possible to weld for a short time the several thousands of contact points of the flat sheet 2 to the corrugated sheet 3 existing along the end surface 1b of the base body 1.

Further, for enhancing the strength of the base body 1 itself, in this embodiment, the flat sheet 2 and the corrugated sheet 3 are welded to each other at the opposed end surface 1a of the base body 1 in the same manner as mentioned above.

As for welding of the flat sheet to the corrugated sheet, the present invention will be compared with the conventional blazing method and laser welding method.

The blazing method has a disadvantage of giving a great deal of heat to the flat sheet and the corrugated sheet thus deteriorating heat resistance of the base body.

In the laser welding method, for perfect welding of the flat sheet to corrugated sheet along the end surface of a base body having a diameter of 86 cm, it needs the welding speed at a pitch 0.5 mm, which takes approximately 30 min.

Conversely, the electric discharge welding of the present invention makes it possible to perfectly weld the flat sheet to the corrugated sheet of the base body identical to the above for a short time, such as 3 min.

Hereinafter, there will be described a method of producing a honeycomb catalyst support wherein the flat sheet 2 is joined to the corrugated sheet 3 and the base body 1 composed of the flat sheet 2 and corrugated sheet 3 is joined to the outer shell 20.

FIG. 4 shows a honeycomb catalyst support including a base body 1 composed of the flat sheet 2 and corrugated sheet 3 alternately laminated and then wound, and an outer shell 20 mounted around the outermost periphery of the base body 1 for fixing the base body portion and enhancing the strength thereof.

With reference to FIG. 5, there will be explained a method of producing the honeycomb catalyst support according to a second embodiment.

First, in a base body forming process, there is obtained a base body 1 composed of a flat sheet 2 and corrugated sheet 3 (not joined to each other yet) having an axial length of 105.2 mm and a diameter of 77 mm.

After that, around the outermost periphery of the base body 1, there is mounted an outer shell having a thickness of approximately 1.5 mm (larger than that of the flat sheet), axial length of 105 mm, inner diameter of 77 mm and outer diameter of 80 mm. In this case, the base body 1 is protruded at both the ends thereof from the outer shell by approximately 0.1 mm.

Next, in an electrode mounting process, likely to the first embodiment, one end surface of a honeycomb catalyst support 21 (not welded yet) is mounted on a second electrode 14 of the electric discharge machine 10 in such a manner as to be electrically conducted. Also, a first electrode 11 is mounted so as to face to the other end surface of the base body 1.

After that, in a joining process, a power supply 15 applies a voltage of 60 V (20–30A) across the electrode 11 and the second electrode 14, and a current control unit 16 operates to intermittently generate electric discharges within the range of a pulse width of 200 ms, thus welding the other end surface of the honeycomb catalyst support 21.

FIG. 6 is a view for explaining the reason why the base body 1 is protruded at both the ends thereof from the outer shell by approximately 0.1 mm.

The honeycomb catalyst support prior to electric discharge welding is formed such that the end surface of the base body 1 is protruded from the end surface of the outer shell 21 as shown in FIG. 6a. This is why the thickness (approximately 0.05 mm) of the flat sheet 2 and corrugated sheet 3 constituting the base body 1 is extremely smaller than the thickness (approximately 1.5 mm) of the outer shell 20, and accordingly, the end surface of the base body 1 is fused by electric discharge welding more rapidly than the outer shell 20.

FIG. 6b is a typical view showing a honeycomb catalyst support after electric discharge welding. As shown in this figure, by protruding the end surface of the base body 1 from the outer shell 21, it is possible to line up the end surface of the base body 1 with that of the outer shell 21 after termination of the electric discharge welding.

In the embodiments mentioned above, the base body is formed in a cylindrical shape; however the form thereof is not limited thereto but may be an elliptic shape in cross-section.

Figure 7:
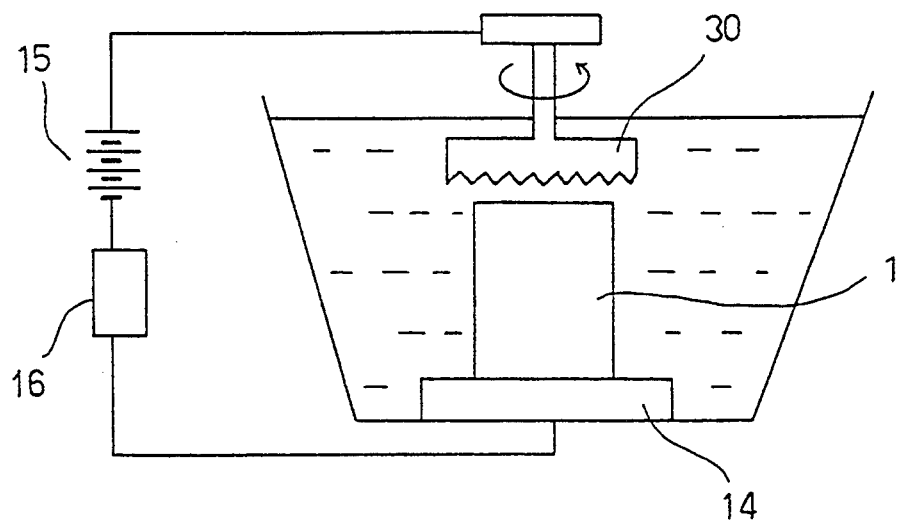
FIG. 7 is an explanatory view showing a third embodiment.

FIG. 7 is a view for explaining a third embodiment of the present invention.

In the embodiments mentioned above, a current is intermittently applied to intermittently generate electric discharges. However, in this embodiment, using the nature of the electric discharge being liable to be generated at the point having a short discharge distance, the electrode is formed with irregularity on the surface facing to the points to be welded as shown in FIG. 7.

In generation of electric discharges between the base body 1 and the electrode 30, the electrode 30 is rotated around the axis of the base body 1. This rotation changes the discharge distance between the electrode 30 and the base body 1 thus intermittently generating electric discharges, which makes it possible to weld a number of points to be welded.

The condition of the electric discharge welding is not limited to the embodiments mentioned above but may be freely selected in voltage, current and welding time within the range of certainly welding the flat sheet to the corrugated sheet and obtaining the desired shape.

In the embodiment mentioned above, by protruding the base body from the outer shell, it is possible to line up the end surface of the base body with that of the outer shell after termination of electric discharge welding. However, there may be proposed a modification of making the end portion of the outer shell on the electric discharge welding side into a tapered shape, whereby the thickness of the outer shell at the tapered end portion is made similar to that of the flat sheet and corrugated sheet thus obtaining the same effect as mentioned above.

As mentioned above, the present invention is adapted for a catalyst support for purifying exhaust gas. However, it is not limited to the method of producing the catalyst support but may be adapted to any application necessary for certainly welding an object having a number of points to be welded for a short time.

In the embodiment mentioned above, the electrode is rotated around the axis of the base body; however it may be moved so as to change the discharge distance between the base body and the electrode facing thereto thus intermittently generating electric discharges.

Further, in the embodiment mentioned above, electric discharges are generated only one time at one point to be welded; however, the present invention is not limited to the above. If a plurality of points can be welded, electric discharges may be generated plural times at one point to be welded.

INDUSTRIAL APPLICABILITY

As described in detail, the present invention is effective for welding multi-points to be welded for a short time, for example, for welding a flat sheet to a corrugated sheet of a catalyst support for purifying exhaust gas.

We claim:

1. A multi-point welding method comprising the steps of:
    bringing points to be welded of an electric conductive first object and points of an electric conductive second object in contact with each other;
    mounting an electrode apart from said points to be welded of said first object by a specified interval so that the electrode and the first object are in a non-contacting state and said electrode faces at least said point to be welded of said first object; and
    intermittently allowing a current to flow between said electrode and either of said first object and said second object neither of which contact said electrode, thereby intermittently generating electric discharges at least between said electrode and said points to be welded;
    wherein said first object, said second object and said electrode are dipped in a liquid for preventing heat caused by electric discharges between said electrode and said points to be welded.

2. A multi-point welding method according to claim 1, wherein said electrode is movable so as to change said specified interval.

3. A multi-point welding method comprising the steps of:
    forming an approximately cylindrical base body by alternately laminating a metal made of a flat sheet and a corrugated sheet and then winding said flat sheet and said corrugated sheet in a spiral shape;
    mounting an electrode apart from one end surface of said base body by a specified interval so that said electrode does not contact said base body and said electrode faces to said one end surface; and
    intermittently allowing a current to flow between said electrode and said base body thereby intermittently generating electric discharges between said electrode and said one end surface of said base body, to thus fuse and weld contact points of said flat sheet to said corrugated sheet.

4. A multi-point welding method according to claim 3, wherein said electrode and said base body are dipped in a working liquid for preventing excessive heating caused by electric discharges generated between said electrode and said base body.

5. A multi-point welding method according to claim 3, wherein said electrode is formed with one of a protrusion and a cavity on the surface facing said one end surface of said base body and said electrode is rotated around the axis of said base body in said electric discharge welding process.

6. A multi-point welding method according to claim 3, said flat sheet and said corrugated sheet are formed having a rectangular shape and are wound in a spiral shape such that the short side of said rectangular shape is taken as the axial length of said base body.

7. A multi-point welding method comprising the steps of:
    forming an approximately cylindrical base body by alternately laminating an electric conductive metal made of a flat sheet and an electric conductive metal made of a corrugated sheet having approximately the same shape as that of said flat sheet, and winding the flat sheet and the corrugated sheet in a spiral shape;
    forming an outer shell around an outermost periphery of said base body;
    mounting an electrode apart from one end surface of said base body by a specified interval so that said electrode does not contact said base body and said electrode faces said end surface; and
    intermittently allowing a current to flow between said electrode and said base body thereby generating electric discharges in said interval, to thus fuse and weld said flat sheet, said corrugated sheet and said outer shell to each other at the same time.

8. A multi-point welding method according to claim 7, wherein said outer shell is mounted around the outermost periphery of said base body such that said base body is protruded from said outer shell by at least a reduced width of said flat sheet and said corrugated sheet through electric discharge welding.

9. A catalyst support composed of a flat sheet and a corrugated sheet alternately laminated and then wound, wherein contact points of said flat sheet to said corrugated sheet are fused and welded to each other by a multi-point electric discharge welding method including mounting an electrode facing one end surface of said catalyst support with a specific interval therebetween so that said catalyst support and said electrode do not contact one another and intermittently generating electric discharges between said electrode and said one end surface of said catalyst support.

10. A catalyst support according to claim 9, wherein at least said catalyst support is dipped in a working liquid.

* * * * *